United States Patent
Kim et al.

(10) Patent No.: US 6,975,523 B2
(45) Date of Patent: Dec. 13, 2005

(54) POWER SUPPLY CAPABLE OF PROTECTING ELECTRIC DEVICE CIRCUIT

(75) Inventors: Hyung-wan Kim, Seongnam (KR); Gil-yong Chang, Gyunggi-do (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 0 days.

(21) Appl. No.: 10/685,564

(22) Filed: Oct. 16, 2003

(65) Prior Publication Data
US 2004/0080961 A1    Apr. 29, 2004

(30) Foreign Application Priority Data
Oct. 16, 2002    (KR) ................ 10-2002-0063108

(51) Int. Cl.$^7$ ............................... H02M 7/122
(52) U.S. Cl. ................ 363/56.11; 363/56.03; 363/56.057; 363/56.1
(58) Field of Search ............ 363/21.07, 21.15, 363/56.05, 56.11, 97, 56.03, 56.09, 56.1; 323/284

(56) References Cited

U.S. PATENT DOCUMENTS

| 5,956,240 A * | 9/1999 | Williams .................. 363/21.16 |
| 6,181,101 B1 * | 1/2001 | Arai et al. .................... 320/104 |
| 6,657,841 B1 * | 12/2003 | Melchert et al. ............. 361/100 |
| 6,775,164 B2 * | 8/2004 | Wong et al. ................. 363/147 |

\* cited by examiner

*Primary Examiner*—Gary L Laxton
(74) *Attorney, Agent, or Firm*—Sughrue Mion, PLLC

(57) ABSTRACT

A power supply protecting the electric device circuit when over-voltage is applied, is provided. The power supply has a rectifying unit rectifying AC power externally supplied, into first and second DC power and outputting the first and the second DC power; a main power supply transformer boosting the first DC power and supplying the boosted first DC power to the electric device circuit; a switching controlling unit driven by the second DC power, performing the operation on the main power supply transformer that causes the first DC power to be boosted when the second DC power is received; and a controlling unit determining whether the second DC power is to be supplied to the switching controlling unit, wherein the controlling unit senses the voltage supplied to the electric device circuit and interrupts supplying the second DC power to the switching controlling unit if the sensed voltage exceeds a given value.

16 Claims, 2 Drawing Sheets

US 6,975,523 B2

POWER SUPPLY CAPABLE OF PROTECTING ELECTRIC DEVICE CIRCUIT

This application claims the priority of Korean Patent Application No. 2002-63108, filed on Oct. 16, 2002, in the Korean Intellectual Property Office, the disclosure of which is incorporated herein by reference in its entirety.

BACKGROUND

1. Field of the Invention

The present invention relates generally to a power supply, and more particularly, it relates to a power supply capable of protecting peripheral circuits when the electric device circuit is applied with over-voltage or the output terminal of the circuit is short-circuited, due to an abnormal operation in the output terminal of the circuit.

2. Description of the Related Art

In general, electric devices such as image displays are driven by the switching mode power supply (SMPS) that is high in efficiency and small and light in size.

FIG. 1 is a schematic block diagram showing an embodiment of the prior art switching mode power supply. With reference to FIG. 1, the switching mode power supply comprises a rectifying unit 11, an auxiliary power supply coordinating unit 13, an auxiliary power supply transformer 15, a controlling unit 17, a photo-coupler 19, a switching controlling unit 21, and a main power supply transformer 23.

The rectifying unit 11 rectifies AC power supplied from an external source into DC power and outputs the rectified power as a DC voltage. Generally, the rectifying unit 11 rectifies AC power supplied from an external source into DC power and generates DC 24V and DC 5V. Here, the DC 24V is boosted in the main power supply transformer 23, outputted to the electric device, and used as the operating power for the electric device. And, the DC 5V is used as the operating power for the controlling unit 17 and the switching controlling unit 21.

The auxiliary power supply coordinating unit 13 is inputted with the DC 5V rectified by the rectifying unit 11. Also, the auxiliary power supply coordinating unit 13 generates a pulse width modulation (PWM) signal and switching-controls the auxiliary power supply transformer 15 based on the generated PWM signal.

The auxiliary power supply transformer 15 is connected to the controlling unit 17 and a light-receiving transistor 19b of the photo-coupler 19. The auxiliary power supply transformer 15, switching-controlled by the auxiliary power supply coordinating unit 13, boosts the DC 5V inputted from the auxiliary power supply coordinating unit 13 to a suitable voltage and supplies the boosted voltage to the controlling unit 17 and the photo-coupler 19.

The auxiliary power supply transformer 15 provides the controlling unit 17 with the boosted voltage through a diode D1. The controlling unit 17 receives the boosted voltage from the auxiliary power supply transformer 15 and generates ON/OFF control signal. The photo-coupler 19 is driven by the generated ON/OFF control signal. That is, the ON/OFF control signal generated by the controlling unit 17 is applied to a light-emitting diode 19a of the photo-coupler 19, and hence the light-emitting diode 19a of the photo-coupler 19 emits the light according to the ON control signal generated by the controlling unit 17. The light-receiving transistor 19b is turned on according to the light emitted by the light-emitting diode 19a of the photo-coupler 19. If the light-receiving transistor 19b is turned on, the supply voltage Vcc boosted by the auxiliary power supply transformer 15 is supplied to the switching controlling unit 21.

If the switching controlling unit 21 is provided with the supply voltage Vcc boosted by the auxiliary power supply transformer 15, the switching controlling unit 21 switching-controls the main power supply transformer 23 so that the DC 24V rectified by the rectifying unit 11 can be boosted. The DC 24V rectified by the rectifying unit 11 is boosted by the main power supply transformer 23, and the boosted voltage is supplied through diode D2 to the electric device circuit.

However, according to the prior art power supply, if the controlling unit 17 generates ON control signal, the supply voltage Vcc from the auxiliary power supply transformer 15 is continuously applied to the switching controlling unit 21, whereby the switching controlling unit 21 continuously supplies the power to the electric device according to the applied voltage Vcc. In this case, if the voltage applied to the electric device circuit exceeds a given voltage due to surge voltage generated in the transforming process by the main power supply transformer 23, there is a possibility that the electric device circuit is damaged or cracked.

SUMMARY

Accordingly, the present invention has been made to solve the above-mentioned problems occurring in the prior art, and an object of the present invention is to provide a power supply capable of protecting the damage of the electric device circuit even when the input terminal of the electric device circuit is short-circuited as well as the electric device circuit is applied with over-voltage.

In order to accomplish this object, in accordance with one aspect of the present invention, there is provided a power supply comprising: a rectifying unit for rectifying AC power supplied from an external source into a first DC power and a second DC power and outputting these power; a main power supply transformer for boosting the first DC power and supplying the boosted power to the electric device circuit; a switching controlling unit driven by the second DC power, for performing the operation on the main power supply transformer that causes the first DC power to be boosted when the second DC power is received; and a controlling unit for determining whether the second DC power is to be supplied to the switching controlling unit, wherein the controlling unit senses the power supply supplied to the electric device circuit and interrupts supplying the second DC power to the switching controlling unit if the sensed voltage exceeds a given value. Also, the controlling unit interrupts supplying the second DC power to the switching controlling unit if the sensed voltage is the short-circuit voltage.

On the other hand, in an exemplary embodiment, the power supply further comprises: an auxiliary power source transformer for boosting the second DC power; a photo-coupler for providing the switching controlling unit with the boosted second DC power based on the output signal of the controlling unit; and a transistor for determining if the second DC power is to be supplied to the switching controlling unit, wherein the transistor is grounded at its emitter terminal, connected to the input terminal of a light-emitting diode of the photo-coupler at its collector terminal, and connected to the input terminal of the electric device at its base terminal. In this case, the transistor is implemented as a NPN-type transistor.

In an exemplary embodiment, the controlling unit further comprises: a zener diode connected between the base terminal of the transistor and the input terminal of the electric device, for turning on the transistor if the first power supplied to the input terminal of the electric device exceeds a given value.

Also, in an exemplary embodiment, the controlling unit further comprises: a diode connected between the collector terminal of the transistor and the input terminal of the electric device, for interrupting supplying the second power to the switching controlling unit if the input terminal of the electric device is short-circuited.

Furthermore, in an exemplary embodiment, the controlling unit further comprises: at least two voltage-dividing resistors connected to the input terminal of the electric device at its one terminal and grounded at its other terminal, wherein the controlling unit is implemented for sensing the power supplied to the electric device on the basis of the voltage applied to the voltage-dividing resistors.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENT

Hereinafter, the description will be made as to an exemplary embodiment of the present invention with reference to FIG. 2. In the following description of the present invention, a detailed description of known functions and configurations incorporated herein will be omitted when it may make the subject matter of the present invention rather unclear.

Figure 1:
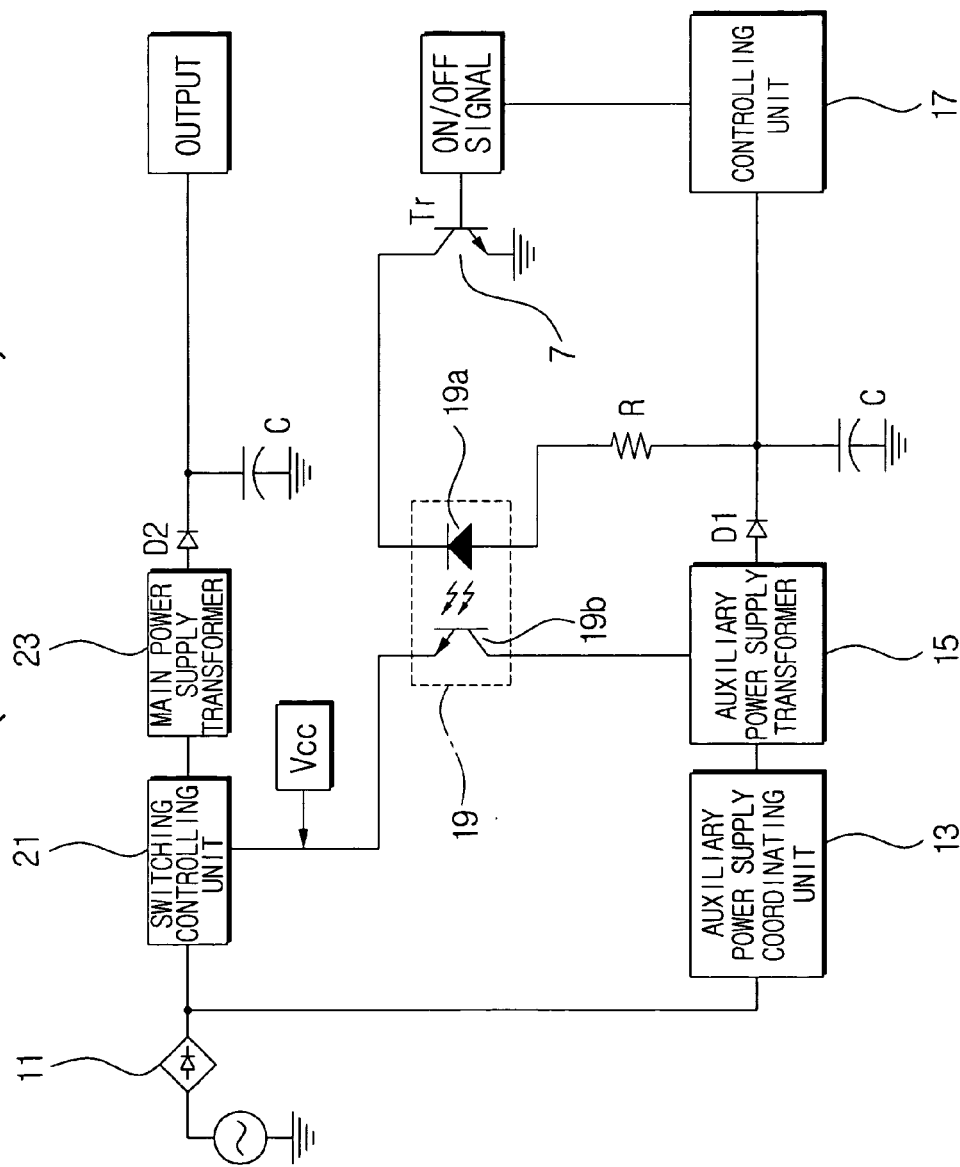
FIG. 1 is a schematic block diagram showing an embodiment of the prior art switching mode power supply.
Figure 2:
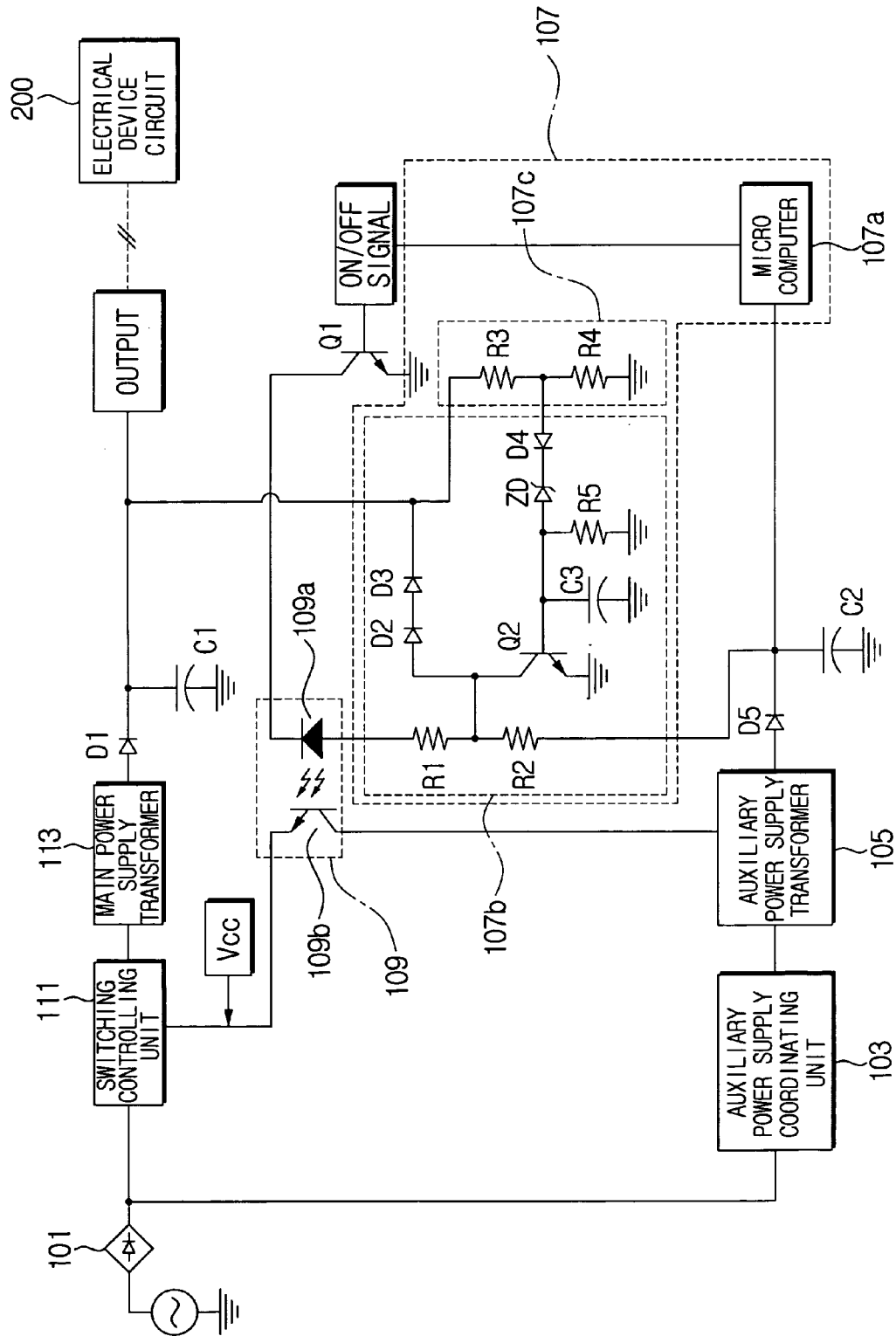
FIG. 2 is a schematic block diagram showing an embodiment of switching mode power supply according to the present invention.

FIG. 2 is a schematic block diagram showing an embodiment of switching mode power supply according to the present invention.

As shown in FIG. 2, the switching mode power supply comprises a rectifying unit 101, an auxiliary power supply coordinating unit 103, an auxiliary power supply transformer 105, a controlling unit 107, a photo-coupler 109, a switching controlling unit 111, and a main power supply transformer 113. Here, the photo-coupler 109 includes a light-emitting diode 109a and a light-receiving transistor 109b. Also, the controlling unit 107 comprises a microcomputer (MICOM) 107a, a Vcc supply voltage coordinating unit 107b, and a sensing unit 107c. The Vcc supply voltage coordinating unit 107b comprises resistors R1, R2, and R5, a transistor Q2, diodes D2 and D3, and D4, a zener diode ZD, and a capacitor C3. The sensing unit 107c includes voltage-dividing resistors R3 and R4 connected in series.

The light-emitting diode 109a of the photo-coupler 109 is connected to the one terminal of at least two resistors connected in series at its input terminal, with the other terminal thereof being connected to the input terminal of the microcomputer 107a. In this embodiment, the resistors connected in series are implemented as two resistors R1 and R2.

The transistor Q2 determines if the switching controlling unit 111 is to be provided with the DC supply voltage Vcc, and the zener diode ZD performs the turn-on operation on the transistor Q2. Here, the transistor Q2 is implemented as a NPN-type transistor. In this case, it is desirable that the zener diode ZD is backwardly connected to the base terminal of the transistor Q2 at its one terminal. Also, in order to provide the base terminal of the transistor Q2 with current in one direction, in an exemplary embodiment, the other terminal of the zener diode ZD and the one terminal of the backward diode D4 are connected in series, and the other terminal of the backward diode D4 is connected between the resistors R3 and R4 that form the voltage-dividing resistor. In an exemplary embodiment, terminals at one end of a capacitor C3 and at one end of a resistor R5 connected in parallel are connected between the zener diode ZD and the transistor Q2, while the terminals of the capacitor C3 and the resistor R5 at their other ends are grounded, respectively. Here, it is implemented that the voltage-dividing resistor (R3, R4) is connected to the input terminal of the electric device circuit 200 with one terminal, while being grounded with the other terminal.

The transistor Q2 is connected between the resistors R1 and R2 at its collector terminal and grounded at the emitter terminal. Also, between the collector terminal of the transistor Q2 and the input terminal of the electric device circuit 200 the diode is series-connected in the forward direction to the collector direction of the transistor Q2, wherein the diode is implemented as diodes D2 and D3 connected in series.

The rectifying unit 101 rectifies AC power supplied from the external into DC power and outputs the rectified power as a DC voltage. Generally, the rectifying unit 101 rectifies AC power supplied from the external into DC power and generates DC 24V and DC 5V. Here, DC 24V is boosted in the main power supply transformer 113, outputted to the electric device, and used as the operating power for the electric devices. And, DC 5V is used as the operating power for the microcomputer 107a and the switching controlling unit 111.

The auxiliary power supply coordinating unit 103 is inputted with the DC 5V rectified by the rectifying unit 101. Also, the auxiliary power supply coordinating unit 103 generates PWM signal and switching-controls the auxiliary power supply transformer 105 based on the generated PWM signal.

The auxiliary power supply transformer 105 is connected to one terminal of the microcomputer 107a and to one terminal of the light-receiving transistor 109b of the photo-coupler 109, respectively. The auxiliary power supply transformer 105, switching-controlled by the auxiliary power supply coordinating unit 103, boosts the DC 5V inputted from the auxiliary power supply coordinating unit 103 to a suitable voltage and supplies the boosted voltage to the microcomputer 107a or the photo-coupler 109.

The auxiliary power supply transformer 105 provides the microcomputer 107a with the boosted voltage through the diode D5. The microcomputer 107a receives the boosted voltage from the auxiliary power supply transformer 105 and generates ON/OFF control signal. The photo-coupler 109 is driven by the ON/OFF control signal generated by the microcomputer 107a. That is, the ON/OFF control signal generated by the microcomputer 107a is applied to the light-emitting diode 109a of the photo-coupler 109, and hence the light-emitting diode 109a of the photo-coupler 109 emits the light according to the ON control signal generated by the microcomputer 107a. The light-receiving transistor 109b is turned on according to the light emitted by the light-emitting diode 109a of the photo-coupler 109. If the light-receiving transistor 109b is turned on, the supply voltage Vcc boosted by the auxiliary power supply transformer 105 is supplied to the switching controlling unit 111.

If the switching controlling unit 111 is provided with the supply voltage Vcc boosted by the auxiliary power supply transformer 105, the switching controlling unit 111 switching-controls the main power supply transformer 113 so that the DC 24V rectified by the rectifying unit 101 can be boosted. The DC 24V rectified by the rectifying unit 101 is boosted by the main power supply transformer 113, and the boosted voltage is supplied through the diode D1 to the electric device circuit 200. A capacitor C1 is connected between the diode D1 and the electric device circuit 200 at the one terminal and grounded at the other terminal.

In the capacitor C1, the voltage supplied to the electric device circuit 200 is stored, and based on the voltage stored in the capacitor C1, each of the resistors R3 and R4 which form the voltage-dividing resistor is provided with a given voltage.

In the transforming process conducted by the main power supply transformer 113, if surge voltage is generated, the voltage applied to the resistor R4 of the voltage-dividing resistors R3 and R4 increases accordingly. If the voltage applied to the resistor R4 exceeds a given value, the base terminal of the transistor Q2 is applied through the zener diode ZD with current.

If the base terminal of the transistor Q2 is applied with the current, the transistor Q2 is turned on and the collector terminal potential of the transistor Q2 becomes zero. At this time, because the collector terminal of the transistor Q2 is connected between resistors R1 and R2, the input terminal potential of the light-emitting diode 109a of the photo-coupler 109 also becomes zero.

If the input terminal potential of the light-emitting diode 109a becomes zero, the light-receiving transistor 109b of the photo-coupler 109 is turned off, thereby interrupting the supply voltage Vcc, which has been supplied to the switching controlling unit 111. Accordingly, the voltage supplied to the electric device circuit 200 based on the ON control signal generated by the microcomputer 107a is interrupted, and hence it is possible to protect the damage of the electric device circuit 200 caused by the over-voltage.

After the switching operation of the switching controlling unit 111 is interrupted, if the voltage applied to the voltage-dividing resistors R3 and R4 is below a given value, the transistor Q2 is turned off based on the operation of the zener diode ZD, resulting in the light-emitting diode 109a of the photo-coupler 109 emitting the light according to the ON control signal from the microcomputer 107a. The light-receiving transistor 109b of the photo-coupler 109 is turned on based on the light emitted from the light-emitting diode 109a, and the switching controlling unit 111 is provided with the supply voltage Vcc boosted by the auxiliary power supply transformer 105. As a result, the main power supply transformer 113 can normally resume providing the electric device circuit 200 with the supply voltage when the supply voltage to the input terminal of the electric device circuit 200 is stabilized.

If the input terminal of the electric device circuit 200 is short-circuited, the potential of the capacitor C1 becomes zero and hence the input terminal potential of the light-emitting diode 109a becomes zero based on the diodes D2 and D3. If the input terminal potential of the light-emitting diode 109a becomes zero, the light-receiving transistor 109b of the photo-coupler 109 is turned off, thereby interrupting the supply voltage Vcc, which has been supplied to the switching controlling unit 111. Accordingly, the voltage supplied to the electric device circuit 200 based on the ON control signal generated by the microcomputer 107a is interrupted, and hence it is possible to protect the damage of the electric device circuit 200 caused by the short-circuit of the input terminal of the electric device circuit.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A power supply comprising:
    a rectifying unit for rectifying an AC power into a first DC power and a second DC power and outputting the first and the second DC power;
    a main power supply transformer for boosting the first DC power and outputting the boosted first DC power to an output;
    a switching controlling unit driven by the second DC power, for performing an operation on said main power supply transformer which causes the first DC power to be boosted when the second DC power is received;
    a controlling unit for determining whether the second DC power is to be supplied to said switching controlling unit;
    an auxiliary power supply transformer for boosting the second DC power; and
    a photo-coupler for providing said switching controlling unit with the boosted second DC power based on an output signal of said controlling unit,
    wherein said controlling unit senses a voltage at the output, and interrupts supplying of the second DC power to the switching controlling unit if the sensed voltage exceeds a given value.

2. The power supply according to claim 1, wherein said controlling unit interrupts supplying of the second DC power to said switching controlling unit if the sensed voltage is a short-circuit voltage.

3. The power supply according to claim 1, wherein said controlling unit comprises:
    a transistor for determining if the second DC power is to be supplied to said switching controlling unit.

4. The power supply according to claim 3, wherein said transistor comprising an emitter terminal, a collector terminal, and a base terminal, is grounded at the emitter terminal, connected to an input terminal of a light-emitting diode of said photo-coupler at the collector terminal, and connected to the output at the base terminal.

5. The power supply according to claim 4, wherein said transistor is implemented as a NPN-type transistor.

6. The power supply according to claim 5, wherein said controlling unit further comprises:
    a zener diode connected between the base terminal of said transistor and the output, for turning on the transistor if the first DC power inputted to the output exceeds a given value.

7. The power supply according to claim 6, wherein said controlling unit further comprises:
    a diode connected between the collector terminal of said transistor and the output, for interrupting supplying of the second DC power to said switching controlling unit if the input terminal of the output is short-circuited.

8. The power supply according to claim 7, wherein said controlling unit further comprises:
    at least two voltage-dividing resistors having a first terminal and a second terminal, connected to the output at the first terminal and grounded at the second terminal, wherein said controlling unit is implemented for sensing the voltage that is supplied to the output on the basis of the voltage applied to said voltage-dividing resistors.

9. The power supply according to claim 8, wherein said output is connected to an electrical device.

10. The power supply according to claim 8, wherein the AC power is externally supplied.

11. The power supply according to claim 1, wherein said output is connected to an electrical device.

12. The power supply according to claim 1, wherein the AC power is externally supplied.

13. The power supply according to claim 1, wherein said controlling unit
receives and senses the boosted first DC power provided to the output device and interrupts the supply of the second DC power to said switching controlling unit if the sensed voltage exceeds a first predetermined value or if the sensed voltage is below a second predetermined value and wherein further, said controlling unit is operable to sense both an overvoltage condition where the sensed voltage exceeds a first predetermined value and an undervoltage condition where the sensed voltage is below a second predetermined value.

14. The power supply according to claim 13 wherein said controlling unit comprises a transistor the base of which is connected to the anode of a zener diode.

15. The power supply according to claim 14 wherein the cathode of the zener diode is connected to the cathode of another diode.

16. The power supply according to claim 15 wherein the anode of the another diode is connected to a voltage divider circuit, wherein the voltage divider circuit is also connected to the boosted first DC power which is provided to the output device.

* * * * *